United States Patent Office 3,577,434
Patented May 4, 1971

3,577,434
N-ARYL - α - (HYDROXYMETHYLENEIMINO)-α'-OXO-CYCLOPOLYMETHYLENEAMINE AND RELATED COMPOUNDS AND A METHOD FOR THEIR PREPARATION
Stanley C. Bell, Penn Valley, and Peter H. L. Wei, Upper Darby, Pa., assignors to American Home Products Corporation, New York, N.Y.
No Drawing. Filed June 10, 1968, Ser. No. 735,524
Int. Cl. C07d 27/08
U.S. Cl. 260—326.5                          10 Claims

ABSTRACT OF THE DISCLOSURE

The disclosure is directed to N - aryl - α - (hydroxymethyleneimino) - α' - oxocyclopolymethyleneamines, N-aryl - α - (methyleneimino) - β - alkanoyl - α' - oxocyclopolymethyleneamines, their substituents, and a method for their preparation. The compounds have central nervous system activity as depressants. That is, they produce a calming effect in the host.

---

This invention relates to new and novel N - aryl - α - (hydroxymethyleneimino) - α' - oxocyclopolymethyleneamines, N - aryl - α - (methyleneimino) - β - alkanoyl-α'-oxocyclopolymethyleneamines, and a process for their preparation.

The compounds within the purview of the present invention are exemplified by those having the following formulas:

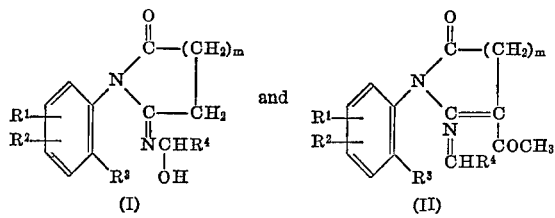

where
$R^1$ and $R^2$ are hydrogen, halogen, lower alkyl, lower alkoxy or sulfamoyl;
$R^3$ is halogen, lower alkyl or lower alkoxy;
$R^4$ is trihalomethane and nitrophenyl; and
$m$ is an integer from 1 to about 3.

As used herein, the terms "lower alkyl," "lower alkoxy" and the like, describe groups containing from one to about eight carbon atoms.

A typical example of the compounds of this invention which is depicted by the structural Formula I is 1-(2,6-dichlorophenyl) - 5 - (1 - hydroxy - 2,2,2 - trichloroethylimino)-pyrrolidin-2-one. The compounds of this invention represented by Formula II are exemplified as 3 - acetyl - 1 - (2,6 - dichlorophenyl) - 2 - p - (nitrobenzylideneamino) - 2 - pyrrolin - 5 - one.

The new and novel compounds of this invention may be prepared by the process which is hereinafter schematically illustrated:

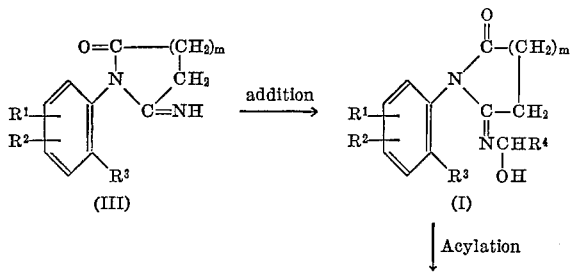

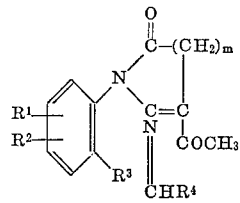

where $R^1$–$R^3$ and $m$ are as defined above.

The starting materials N - aryl - α - imino - α' - oxocyclopolymethyleneamines (III) of the present invention may be prepared as described in the application of P. H. L. Wei and S. C. Bell entitled "Process for Preparing N-Aryl-α-Oxocyclopolymethylene Amines and Related Compounds," filed in the U.S. Patent Office on June 10, 1968 as Ser. No. 735,540 and still pending. In that application it is disclosed that the N - aryl - α - imino - α' - oxocyclopolymethyleneamines may be prepared in a two step process. In the first step, a solution of an aniline is contacted with a haloalkanoyl halide in an organic solvent, such as chloroform, at a temperature range from about 0° C. up to the reflux temperature for a period of about 1 to about 4 hours, affording a haloalkanoylanilide product. In the second step, a solution of the haloalkanoyl anilide and an alkali metal cyanide in absolute ethanol are heated at a temperature range of about 50 to 100° C. for a period of about 6 to 20 hours affording a product which may be recovered by well known separation and purification techniques. A product is an N - aryl - α - imino - α' - oxocyclopolymethyleneamine (III) the starting material of this invention.

To prepare the N - aryl - α - (hydroxymethyleneimino)-α' - oxocyclopolymethyleneamine (I) of the present invention, an N - aryl - α - imino - α' - oxocyclopolymethyleneamine (III) and an aldehyde, such as p-nitrobenzaldehyde, are dissolved in a reaction-inert organic solvent, such as benzene, and heated at a temperature range from about 60 to 100°, preferably about 100° C., for a period of about 1 to 6 hours, preferably about 1 to 4 hours, affording the product N - aryl - α - (hydroxymethyleneimino)-α'-oxocyclopolymethyleneamine (I), which may be separated and purified by well known techniques. For instance, the solution may be treated with an activated carbon, such as Darco, concentrated in vacuo and the residue treated with ether and a small amount of benzene and collected.

To prepare the N-aryl-α-methyleneimino-β-alkanoyl-α'-oxocyclopolymethyleneamines (II) of the present invention the product from the previous step is heated in a carboxylic acid anhydride, such as acetic anhydride, at a temperature range of 60° to 100° C., preferably about 100° C., for a period of about 2 to 4 hours, preferably about 3 hours, and allowed to stand for an extended period up to about 15 hours, affording the product. The product may be recovered by well known techniques. For instance, it may be collected, washed with ether and recrystallized from benzene.

The new and novel N-aryl-α-(hydroxymethyleneimino)-α'-oxocyclopolymethyleneamines (I) and N - aryl - α-(methyleneimino)-β-alkanoyl-α' - oxocyclopolymethyleneamines (II) of the present invention are central nervous system depressants. That is, they produce a calming effect in the host.

In the pharmacological evaluation of the biological activity of the compounds of this invention, the in vivo effects are tested as follows: The compound is administered orally or intraperitoneally to three mice (14–24 grams) at each of the following doses: 400, 127, 40 and 12.7 milligrams per kilogram of host body weight. The animals are observed for a minimum of two hours during which time are noted signals of general stimulation (that is, increased spontaneous motor activity, hyperactivity on tactile, stimulation, twitching), general depression (that is, decreased spontaneous motor activity, decreased respiration) and autonomic activity, (that is, miosis, mydriasis).

The products of the present invention induce central nervous system depressant effects at an oral dose of 400 miligrams per kilogram of host body weight.

When the compounds of this invention are employed as described above, they may be administered alone or in combination with pharmacologically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intramuscularly, intravenously or subcutaneously. For parenteral administration they may be used in the form of a sterile solution containing other solutes, for example, enough saline or glucose to make the solution isotonic.

The dosage of the present pharmacological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE 1

This example illustrates the preparation of 1-(2,6-dichlorophenyl)-5-($\alpha$-hydroxy-p-nitrobenzylimino)pyrrolidin-2-one.

A solution of 1-(2,6-dichlorophenyl)-5-iminopyrrolidin-2-one (3.70 grams or 0.0152 mole) and p-nitrobenzoaldehyde (2.53 g. or 0.0168 m.) in 100 ml. benzene is heated to reflux on a steam bath for four hours. The solution after treatment with Darco is concentrated in vacuo and the residue treated with ether and then a small amount of benzene and collected. This portion weighs 2.4 g. From the ether and benzene washings more product is recovered. The recovered material is suspended in water, and the mixture heated on a steam bath for two hours. Water is decanted and the solid is first dried and then washed with ether to afford 0.7 g. of product. An analytical sample is prepared by recrystallization from ether and has a melting point of 168–70° C.

Based on the formula $C_{17}H_{13}Cl_2N_3O_4$, it is calculated that the elemental analysis by weight of the product would be 51.80 percent carbon, 3.32 percent hydrogen, 10.66 percent nitrogen, and 17.99 percent chlorine. The product is analysed and the content is found to be 51.70 percent carbon, 3.37 percent hydrogen, 10.63 percent nitrogen, and 18.15 percent chlorine. The foregoing may be expressed:

Analysis.—Calcd. for $C_{17}H_{13}Cl_2N_3O_4$ (percent): C, 51.80; H, 3.32; Cl, 17.99; N, 10.66. Found (percent): C, 51.70; H, 3.37; Cl, 18.15; N, 10.63.

EXAMPLES 2–13

Following the procedure of Example I, but substituting the following starting materials for 1-(2,6-dichlorophenyl)-5-iminopyrrolidin-2-one, the following products are obtained:

| Ex. | Starting material | Product |
|---|---|---|
| 2 | 1-(2,3,5-trifluorophenyl)-6-iminopiperidin-2-one. | 1-(2,3,5-trifluorophenyl)-6-($\alpha$-hydroxy-p-nitrobenzylimino)-piperidin-2-one. |
| 3 | 1-(2,4,5-tribromophenyl)-7-iminohexahydroazepin-2-one. | 1-(2,4,5-tribromophenyl)-7-($\alpha$-hydroxy-p-nitrobenzylimino)-hexahydroazepin-2-one. |
| 4 | 1-(2,3,4-triiodophenyl)-6-iminopiperidin-2-one. | 1-(2,3,4-triiodophenyl)-6-($\alpha$-hydroxy-p-nitrobenzylimino)-piperidin-2-one. |
| 5 | 1-(3-bromo-5-chloro-2-methylphenyl)-5-iminopyrrolidin-2-one. | 1-(3-bromo-5-chloro-2-methylphenyl)-5-($\alpha$-hydroxy-p-nitrobenzylimino)pyrrolidin-2-one. |
| 6 | 1-(2-ethyl-4-fluoro-5-iodophenyl)-6-iminopiperidin-2-one. | 1-(2-ethyl-4-fluoro-5-iodophenyl)-6-($\alpha$-hydroxy-p-nitrobenzylimino)piperidin-2-one. |
| 7 | 1-(2-methylphenyl)-5-iminopyrrolidin-2-one. | 1-(2-methylphenyl)-5-($\alpha$-hydroxy-p-nitrobenzylimino)pyrrolidin-2-one. |
| 8 | 1-(2,3,5-tributylphenyl)-6-iminopiperidin-2-one. | 1-(2,3,5-tributylphenyl)-6-($\alpha$-hydroxy-p-nitrobenzylimino)-piperidin-2-one. |
| 9 | 1-(2-ethoxy-4-ethyl-5-sulfamoylphenyl)-7-iminohexahydroazepin-2-one. | 1-(2-ethoxy-4-ethyl-5-sulfamoylphenyl)-7-($\alpha$-hydroxy-p-nitrobenzylimino)hexahydroazepin-2-one. |
| 10 | 1-(2,6-dimethoxyphenyl)-6-iminopiperidin-2-one. | 1-(2,6-dimethoxyphenyl)-($\alpha$-hydroxy-p-nitrobenzylimino)-piperidin-2-one. |
| 11 | 1-(2,4-dibutoxyphenyl)-5-iminopyrrolidin-2-one. | 1-(2,4-dibutoxyphenyl)-5-($\alpha$-hydroxy-p-nitrobenzylimino)-pyrrolidin-2-one. |

EXAMPLE 12

This example illustrates the preparation of 1-(2,6-dichlorophenyl)-5-(1 - hydroxy-2,2,2-trichloroethylimino)-pyrrolidin-2-one.

A solution of 1-(2,6-dichlorophenyl)-5-iminopyrrolidin-2-one (4.8 g. or 0.02 m.) and chloral hydrate (3.6 g. or 0.022 m.) in 100 milliliters of benzene is heated on a steam bath for one hour. After treatment with Darco, the solvent is removed and the residual solid is recrystallized twice from benzene. There is obtained 3.0 grams of the product having a melting point of 137–9°. The compound is unstable upon drying at elevated temperatures.

Analysis.—Calcd. for $C_{12}H_9Cl_5N_2O_2 \cdot \frac{1}{2}C_6H_6$ (percent): C, 41.93; H, 2.82; Cl, 41.27; N, 6.52. Found (percent): C, 42.56; H, 2.92; Cl, 41.13; N, 6.25.

EXAMPLES 13–22

Following the procedure of Example 12, but substituting the following starting materials for 1-(2,6-dichlorophenyl)-5-iminopyrrolidin-2-one and chloral hydrate, the following products are obtained:

| Ex. | Starting material | Product |
|---|---|---|
| 13 | 1-(2,3,5-trifluorophenyl)-6-iminopiperidin-2-one and trifluoroacetaldehyde. | 1-(2,3,5-trifluorophenyl)-6-($\alpha$-hydroxy-2,2,2-trifluoroethylimino) piperidin-2-one. |
| 14 | 1-(2,4,5-tribromophenyl)-7-iminohexahydroazepin-2-one and tribromoacetaldehyde. | 1-(2,4,5-tribromophenyl)-7-($\alpha$-hydroxy-2,2,2-tribromoethylimino)hexahydroazepin-2-one. |
| 15 | 1-(2,3,4-triiodophenyl)-6-iminopiperidin-2-one and triiodoacetaldehyde. | 1-(2,3,4-triiodophenyl)-6-($\alpha$-hydroxy-2,2,2-triiodeothylimino)-piperidin-2-one. |
| 16 | 1-(3-bromo-5-chloro-2-methylpenyl)-5-iminopyrrolidin-2-one and trifluoroacetaldehyde. | 1-(3-bromo-5-chloro-2-methylphenyl)-5-($\alpha$-hydroxy-2,2,2-trifluoroethylimino)-pyrrolidin-2-one. |
| 17 | 1-(2-ethyl-4-fluoro-5-iodophenyl)-6-iminopiperidin-2-one and chloral hydrate. | 1-(2-ethyl-4-fluoro-5-iodophenyl)-6-($\alpha$-hydroxy-2,2,2-trichloroethylimino)-piperidin-2-one. |
| 18 | 1-(2-methylphenyl)-5-iminopyrrolidin-2-one and chloral hydrate. | 1-(2-methylphenyl)-5-($\alpha$-hydroxy-2,2,2-trichloroethylimino)-pyrrolidin-2-one. |

3,577,434

| Ex. | Starting material | Product |
|---|---|---|
| 19 | 1-(2,3,5-tributylphenyl)-6-iminopiperidin-2-one and trifluoroacetaldehyde. | 1-(2,3,5-tributylphenyl)-6-(α-hydroxy-2,2,2-trifluoroethylimino)piperidin-2-one. |
| 20 | 1-(2-ethoxy-4-ethyl-5-sulfamoylphenyl)-7-iminohexahydroazepin-2-one and tribromoacetaldehyde. | 1-(2-ethoxy-4-ethyl-5-sulfamoylphenyl)-7-(α-hydroxy-2,2,2-tribromoethylimino)-hexahydro azepin-2-one. |
| 21 | 1-(2,6-dimethoxyphenyl)-6-iminopiperidin-2-one and triiodoacetaldehyde. | 1-(2,6-dimethoxyphenyl)-6-(α-hydroxy-2,2,2-triiodoethylimino) piperidin-2-one. |
| 22 | 1-(2,4-dibutoxyphenyl)-5-iminopyrrolidin-2-one and trifluoroacetaldehyde. | 1-(2,4-dibutoxyphenyl)-5-(α-hydroxy-2,2,2-trifluoroethylimino)-pyrrolidin-2-one. |

EXAMPLE 23

This example illustrates the preparation 3-acetyl-1-(2,6-dichlorophenyl) - 2 - (p-nitrobenzylideneamino)-2-pyrrolin-5-one.

1-(2,6-dichlorophenyl-5-(α - hydroxy-p-nitrobenzylimino)pyrrolidin-2-one (8.3 grams) is heated in 80 milliliters of acetic anhydride on a steam bath for 3½ hours, and the solution is let stand at room temperature overnight. The orange solid (3.2 grams) is collected and washed with ether. The crude material is recrystallized from benzene and has a melting point of 240–2° C.

*Analysis.*—Calcd. for $C_{19}H_{13}Cl_2N_3O_4$ (percent): C, 54.56; H, 3.13; Cl, 16.95; N, 10.05. Found (percent): C, 54.24; H, 3.19; Cl, 16.76; N, 9.99.

EXAMPLES 24–35

Following the procedure of Example 27 but substituting the following starting materials for 1-(2,6-dichlorophenyl)-5-(α-hydroxy-p-nitrobenzylimino)pyrrolidin - 2 - one affords the following products:

| Ex. | Starting material | Product |
|---|---|---|
| 24 | 1-(2,3,5-trifluorophenyl)-6-(α-hydroxy-p-nitrobenzylimino)piperidin-2-one. | 5-acetyl-3,4-dihydro-6-(p-nitrobenzylideneamino)-1-(2,3,5-trifluorophenyl)-2(1H)-pyridone. |
| 25 | 1-(2,4,5-tribromophenyl)-7-(α-hydroxy-p-nitrobenzylimino)hexahydroazepin-2-one. | 6-acetyl-4,5-dihydro-7-(p-nitrobenzylideneamino)-1-(2,4,5-tribromophenyl)-1H-azepin-2(3H)-one. |
| 26 | 1-(2,3,4-triiodophenyl)-6-(α-hydroxy-p-nitrobenzylimino)piperidin-2-one. | 5-acetyl-3,4-dihydro-6-(p-nitrobenzylideneamino)-1-(2,3,4-tribromophenyl)-2(1H)-pyridon. |
| 27 | 1-(3-bromo-5-chloro-2-methylphenyl)-5-(α-hydroxy-p-nitrobenzylimino)-pyrrolidin-2-one. | 3-acetyl-1-(6-bromo-4-chloro-o-tolyl)-2-(p-nitrobenzylideneamino)-2-pyrrolin-5-one. |
| 28 | 1-(2-ethyl-4-fluoro-6-iodophenyl)-6-(α-hydroxy-p-nitrobenzylimino)-piperidin-2-one. | 5-acetyl-3,4-dihydro-6-(p-nitrobenzylideneamino)-1-(2-ethyl-4-fluoro)-5-iodophenyl-2(1H)-pyridone. |
| 29 | 1-(2-ethylphenyl)-6-(α-hydroxy-p-nitrobenzylimino)piperidin-2-one. | 5-acetyl-3,4-dihydro-6-(p-nitrobenzylideneamino)-1-(2-ethylphenyl)-2(1H)-pyridone. |
| 30 | 1-(2,3,5-tributylphenyl)-7-(α-hydroxy-p-nitrobenzylimino)hexahydroazepin-2-one. | 6-acetyl-4,5-dihydro-7-(p-nitrobenzylideneamino)-1-(2,3,5-tributylphenyl)-1H-azepin-2(3H)-one. |
| 31 | 1-(2-ethoxy-4-ethyl-5-sulfamoylphenyl)-7-(α-hydroxy-p-nitrobenzylimino)hexahydroazepin-2-one. | 6-acetyl-4,5-dihydro-7-(p-nitrobenzylideneamino)-1-(2-ethoxy-4-ethyl-5-sulfamoylphenyl)-1H-azepin-2(3H)-one. |
| 32 | 1-(2,6-dimethoxyphenyl)-6-(α-hydroxy-p-nitrobenzylimino)piperidin-2-one. | 5-acetyl-3,4-dihydro-6-(p-nitrobenzylideneamino)-1-(2,6-dimethoxy)-2-(1H)pyridone. |
| 33 | 1-(2,4-dibutoxyphenyl)-7-(α-hydroxy-p-nitrobenzylimino)hexahydroazepin-2-one. | 6-acetyl-4,5-dihydro-7-(p-nitrobenzylideneamino)-1-(2,4-dibutoxyphenyl)-1H-azepin-2(3H)-one. |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A compound selected from those having the structural formulae:

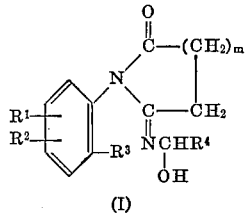 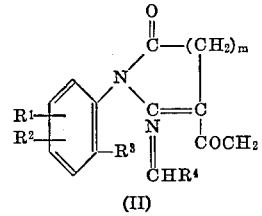

where $R^1$ and $R^2$ are selected from the class consisting of hydrogen, halogen, lower alkyl, lower alkoxy and sulfamoyl;

$R^3$ is selected from the class consisting of halogen, lower alkyl and lower alkoxy;

$R^4$ is selected from the class consisting of trihalomethane and nitrophenyl; and $m$ is an integer from 1 to 3.

2. A compound as defined in claim 1 which is 1-(2,6-dichlorophenyl) - 5 - (α-hydroxy-p-nitrobenzylimino)pyrrolidin-2-one.

3. A compound as defined in claim 1 which is 3-acetyl-1-(2,6-dichlorophenyl) - 2 - (p-nitrobenzylideneamino)-2-pyrrolin-5-one.

4. A compound as defined in claim 1 which is 1-(2,6-dichlorophenyl) - 5 - (1-hydroxy - 2,2,2 - trichloroethylimino)-2-pyrrolidin-2-one.

5. A process for the preparation of a compound selected from the group consisting of those having the formula:

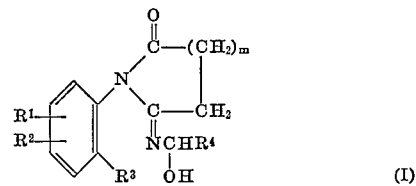

which comprises:

(A) Contacting an aldehyde and an N-aryl-α-imino-α'-oxocyclopolymethyleneamine having the formula:

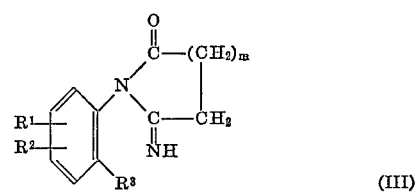

at a temperature range of about 60 to 100° C. for a period of about 1 to 6 hours, where $R^1$ and $R^2$ are selected from the group consisting of hydrogen, halogen, lower alkyl, lower alkoxy and sulfamoyl;

$R^3$ is selected from the class consisting of halogen, lower alkyl and lower alkoxy;

$R^4$ is selected from the class consisting of trihalomethane and nitrophenyl; and $m$ is an integer from 1 to 3.

6. A process for the preparation of a compound selected from the group consisting of those having the formula:

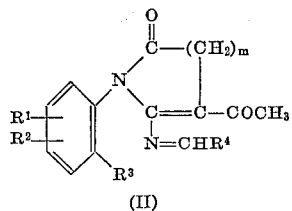

(II)

which comprises:

(A) Contacting an aldehyde and an N-aryl-α-imino-α'-oxocyclopolymethyleneamine having the formula:

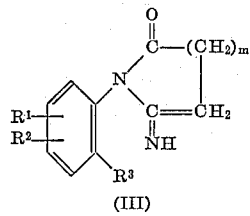

(III)

at a temperature range of about 60 to 100° C. for a period of about 1 to 6 hours; and (B) Contacting the product of step A with a carboxylic acid anhydride at a temperature range of about 60 to 100° C. for a period of about 2 to 4 hours, where $R^1$ and $R^2$ are selected from the group consisting of hydrogen, halogen, lower alkyl, lower alkoxy and sulfamoyl;

$R^3$ is selected from the class consisting of halogen, lower alkyl and lower alkoxy;

$R^4$ is selected from the class consisting of trihalomethane and nitrophenyl; and $m$ is an integer from 1 to 3.

7. A process as defined in claim 6 in which said aldehyde is selected from the class consisting of chloral hydrate and p-nitrobenzaldehyde.

8. A process as defined in claim 6 which step A is carried out at about 100° C. for about 1 to 4 hours.

9. A process as defined in claim 6 in which step B is carried out at about 100° C. for about 3 hours.

10. A process as defined in claim 9 in which said acid anhydride is acetic anhydride.

References Cited

UNITED STATES PATENTS 3,317,390    5/1967    Hofmann et al. __ 260—326.5(X)

ALEX MAZEL, Primary Examiner

J. A. NARCAVAGE, Assistant Examiner

U.S. Cl. X.R.

260—239.3, 294.7; 424—244, 267, 274